US012794253B2

(12) United States Patent
Jeon et al.

(10) Patent No.: US 12,794,253 B2
(45) Date of Patent: Nov. 10, 2026

(54) POWER SUPPLY DEVICE AND METHOD, FOR CONTROLLING CHARGING VOLTAGE

(71) Applicant: Samsung Electronics Co., Ltd., Suwon-si (KR)

(72) Inventors: Hyekyung Jeon, Suwon-si (KR); Sungjin Kim, Suwon-si (KR); Hongsup Lee, Suwon-si (KR); Sangkyung Park, Suwon-si (KR); Seunga Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 789 days.

(21) Appl. No.: 17/884,976

(22) Filed: Aug. 10, 2022

(65) Prior Publication Data

US 2022/0385085 A1 Dec. 1, 2022

Related U.S. Application Data

(63) Continuation of application No. PCT/KR2021/001576, filed on Feb. 5, 2021.

(30) Foreign Application Priority Data

Feb. 10, 2020 (KR) ........................ 10-2020-0015958
Dec. 24, 2020 (KR) ........................ 10-2020-0183475

(51) Int. Cl.
*H02J 7/82* (2026.01)
*H02J 7/42* (2026.01)
(Continued)

(52) U.S. Cl.
CPC .................. *H02J 7/82* (2026.01); *H02J 7/42* (2026.01); *H02J 7/96* (2026.01); *H04R 1/1025* (2013.01)

(58) Field of Classification Search
CPC .................................................... H04R 1/1025
(Continued)

(56) References Cited

U.S. PATENT DOCUMENTS 11,431,185 B1 * 8/2022 Feng ........................ H02J 7/007
2012/0098488 A1 * 4/2012 Ichikawa .................. H02J 7/02
320/109
(Continued)

FOREIGN PATENT DOCUMENTS

CN 109510267 A 3/2019
JP 3224324 U 12/2019
(Continued)

OTHER PUBLICATIONS

Korean Office Action dated Sep. 15, 2025, issued in Korean Application No. 10-2020-0183475.

*Primary Examiner* — Drew A Dunn
*Assistant Examiner* — Pamela J Jeppson
(74) *Attorney, Agent, or Firm* — Jefferson IP Law, LLP

(57) ABSTRACT

A power supply device including a first charging accommodation, a second charging accommodation, a first interface electrically connected to a first power receiving device, and disposed in the first charging accommodation, a second interface electrically connected to a second power receiving device, and disposed in the second charging accommodation, a battery, and a processor configured to receive, via the first interface, first state of charge (SOC) information of the first power receiving device which is mounted in the first charging accommodation, receive, via the second interface, second SOC information of the second power receiving device which is mounted in the second charging accommodation, determine at least one charging parameter based on the first SOC information and the second SOC information, and charge the first power receiving device and the second power receiving device through the first interface and the
(Continued)

second interface, respectively, based on the at least one charging parameter.

20 Claims, 13 Drawing Sheets

(51) Int. Cl.
*H02J 7/96* (2026.01)
*H04R 1/1025* (2026.01)

(58) Field of Classification Search
USPC .......................................................... 320/132
See application file for complete search history.

(56) References Cited

U.S. PATENT DOCUMENTS

| | | | | |
|---|---|---|---|---|
| 2013/0015809 | A1* | 1/2013 | Frey | B60L 53/30 320/106 |
| 2013/0200844 | A1 | 8/2013 | Lee et al. | |
| 2017/0094399 | A1 | 3/2017 | Chandramohan et al. | |
| 2017/0164089 | A1 | 6/2017 | Lee et al. | |
| 2018/0215278 | A1* | 8/2018 | Yabuuchi | H01M 10/48 |
| 2019/0081499 | A1 | 3/2019 | Sun et al. | |
| 2019/0200113 | A1 | 6/2019 | Kim et al. | |
| 2019/0379216 | A1* | 12/2019 | Yoon | B64U 10/13 |

FOREIGN PATENT DOCUMENTS

| | | | |
|---|---|---|---|
| KR | 10-2013-0090703 | A | 8/2013 |
| KR | 10-2017-0067050 | A | 6/2017 |
| KR | 10-2019-0078949 | A | 7/2019 |
| KR | 10-2019-0115962 | A | 10/2019 |

* cited by examiner

POWER SUPPLY DEVICE AND METHOD, FOR CONTROLLING CHARGING VOLTAGE

CROSS-REFERENCE TO RELATED APPLICATION(S)

This application is a continuation application, claiming priority under § 365(c), of an International application No. PCT/KR2021/001576, filed on Feb. 5, 2021, which is based on and claims the benefit of a Korean patent application number 10-2020-0015958, filed on Feb. 10, 2020, in the Korean Intellectual Property Office, and of a Korean patent application number 10-2020-0183475, filed on Dec. 24, 2020, in the Korean Intellectual Property Office, the disclosure of each of which is incorporated by reference herein in its entirety.

BACKGROUND

1. Field

The disclosure relates to a power supply device and a method for controlling a charging voltage based on a state of charge (SOC) of a power receiving device.

2. Description of Related Art

Code-free types without lines of earphones have the highest share in the field of Bluetooth earphones. Since a Bluetooth earphone of a code-free type does not have a line for connecting between an electronic device and an earphone unit, there is an advantage that a user wearing the earphone may freely move. The Bluetooth earphone of the code-free type may include a separate battery and may be used by charging the battery.

The above information is presented as background information only to assist with an understanding of the disclosure. No determination has been made, and no assertion is made, as to whether any of the above might be applicable as prior art with regard to the disclosure.

SUMMARY

The whole size of an earphone having a battery mounted therein has been reduced so as to prevent inconvenience even when a user wears the earphone for a long time, but the reduction in the size of the earphone results in reduction in the capacity of the battery, and causes a disadvantage that a lasting time of the battery of the Bluetooth earphone of the code-free type is short. In order to compensate for this disadvantage, the Bluetooth earphone of the code-free type may be provided with a separate charging case for performing a power supply function, and may be charged and stored therein.

When the Bluetooth earphone of the code-free type is mounted in the charging case, a charging operation may be initiated. In addition, most of the earphones, of the code-free type, may operate in a pair, but the respective earphone units may have different states of battery remaining capacity according to a using environment. For example, the right earphone unit may have 60% battery left, whereas the left earphone unit may have 35% battery left.

In a case in which the respective earphone units are mounted in the charging case, the charging case steps up a voltage and supplies power to the earphone units with a fixed voltage. Since a related-art charging case does not know states of battery remaining capacity of earphone units, the operation of stepping up the voltage is required. In addition, the respective earphone units step down the supplied voltage to an appropriate voltage according to different states of battery remaining capacity. That is, the Bluetooth earphone of the code-free type has a problem that efficiency is degraded due to a primary loss which is caused by stepping up of the voltage in the charging case, and a secondary loss which is caused by stepping down of the voltage in the earphone unit.

In addition, the related-art charging case charges earphone units mounted in the charging case by using a data line of an interface.

Aspects of the disclosure are to address at least the above-mentioned problems and/or disadvantages and to provide at least the advantages described below. Accordingly, an aspect of the disclosure is to provide a power supply device that receives information including a battery remaining capacity state of a power receiving device from the power receiving device, and that charges the power receiving device with an appropriate charging voltage, based on the received information.

Additional aspects will be set forth in part in the description which follows and, in part, will be apparent from the description, or may be learned by practice of the presented embodiments.

In accordance with an aspect of the disclosure, a power supply device is provided. The power supply device includes a first charging accommodation configured to have a first power receiving device mounted therein, and a second charging accommodation configured to have a second power receiving device mounted therein, the second power receiving device forming a pair with the first power receiving device, a first interface electrically connected with the first power receiving device and disposed in the first charging accommodation, a second interface electrically connected with the second power receiving device and disposed in the second charging accommodation, a battery, and at least one processor electrically connected with the first interface, the second interface, and the battery, and the at least one processor may be configured to receive first state of charge (SOC) information of the first power receiving device mounted in the first charging accommodation through the first interface, receive second SOC information of the second power receiving device mounted in the second charging accommodation through the second interface, determine at least one charging parameter, based on the first SOC information and the second SOC information, and, based on the determined at least one charging parameter, charge the first power receiving device and the second power receiving device through the first interface and the second interface, respectively.

In accordance with another aspect of the disclosure, an operating method of a power supply device is provided. The operating method includes receiving first state of charge (SOC) information of a first power receiving device mounted in a first charging accommodation through a first interface, receiving second SOC information of a second power receiving device mounted in a second charging accommodation through a second interface, determining at least one charging parameter, based on the first SOC information and the second SOC information, and, based on the determined at least one charging parameter, charging the first power receiving device and the second power receiving device through the first interface and the second interface, respectively.

In accordance with another aspect of the disclosure, a power receiving device is provided. The power receiving device includes a housing including a part mounted to be wearable on user's ear, a battery included inside the housing, an interface including a power terminal for receiving power from a power supply device, and a ground terminal, and at least one processor electrically connected with the battery and the interface, and the at least one processor may be configured to receive a request for first SOC information from the power supply device through the interface, to transmit the first SOC information to the power supply device through the interface, and to receive a first charging voltage corresponding to the first SOC information through the interface.

According to various embodiments of the disclosure, an electronic device and a method enable a power supply device to receive state of charge (SOC) information from a power receiving device, and to determine a charging voltage for charging the power receiving device based on the SOC information, so that charging is efficiently controlled.

According to various embodiments of the disclosure, an electronic device and a method may control charging by performing communication by using a power line.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalent.

It is to be understood that the singular forms "a," "an," and "the" include plural referents unless the context clearly dictates otherwise. Thus, for example, reference to "a component surface" includes reference to one or more of such surfaces.

Figure 1:
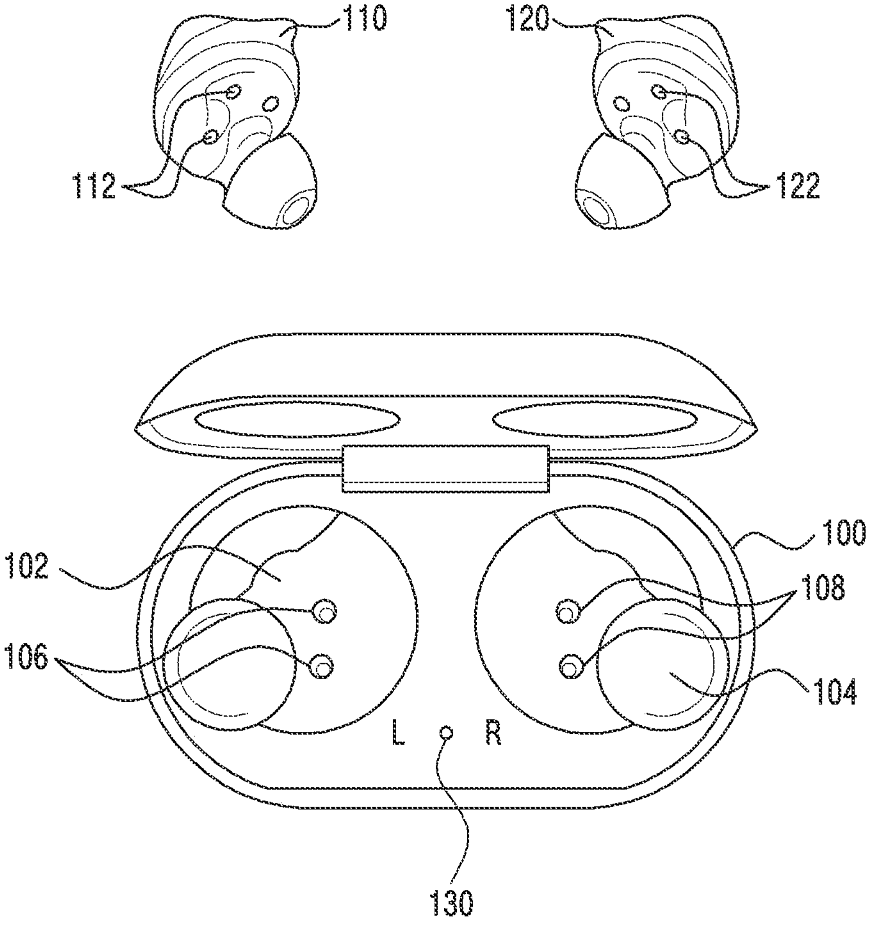
FIG. 1 is a view illustrating a power supply device and a power receiving device according to an embodiment of the disclosure.

FIG. 1 illustrates a power supply device and a power receiving device according to an embodiment of the disclosure.

Referring to FIG. 1, the power supply device 100 may include a first accommodation unit 102 to have a first power receiving device 110 mounted therein, and a second accommodation unit 104 to have a second power receiving device 120 mounted therein. In an embodiment, a first interface 106 including at least one terminal may be disposed on a bottom surface of the first accommodation unit 102. In another embodiment, a second interface 108 including at least one terminal may be disposed on a bottom surface of the second accommodation unit 104.

In yet another embodiment, the first interface 106 and the second interface 108 may include a pogo pin. In yet another embodiment, the first interface 106 and the second interface 108 may include at least one of a power terminal for charging, a ground (GND) terminal, a detect terminal, and a terminal for data communication. In yet another embodiment, the first interface 106 and the second interface 108 may include at least one terminal for performing two or more functions of a function of the power terminal for charging, a function of the detect terminal, and a function of the terminal for data communication. For example, the at least one terminal included in the first interface 106 may detect that the first power receiving device 110 is mounted in the first accommodation unit 102, may charge the first power receiving device 110, and may perform data communication with the first power receiving device 110.

In yet another embodiment, the power supply device 100 may include a light emitting diode (LED) display lamp 130. In yet another embodiment, the LED display lamp 130 may output a signal in a case in which at least one of the first power receiving device 110 and the second power receiving device 120 is mounted in at least one accommodation unit of the first accommodation unit 102 and the second accommodation unit 104. For example, in a case in which the first power receiving device 110 is mounted in the first accommodation unit 102, the LED display lamp 130 may output a signal (e.g., green light or red light) indicating a charging state (e.g., a fully charged state or a charging-in-progress state) of the first power receiving device 110. In yet another embodiment, the power supply device 100 may include a plurality of LED display lamps 130.

In yet another embodiment, the first power receiving device 110 may receive power from the power supply device 100 through a first interface 112. In an embodiment, the second power receiving device 120 may receive power from the power supply device 100 through a second interface 122. In yet another embodiment, the first power receiving device 110 and the second power receiving device 120 may transmit data to the power supply device 100 through the first interface 112 and the second interface 122, respectively. For example, the first power receiving device 110 may transmit, to the power supply device 100, data including information regarding a state of charge (SOC) of a battery of the first power receiving device 110.

Figure 2:
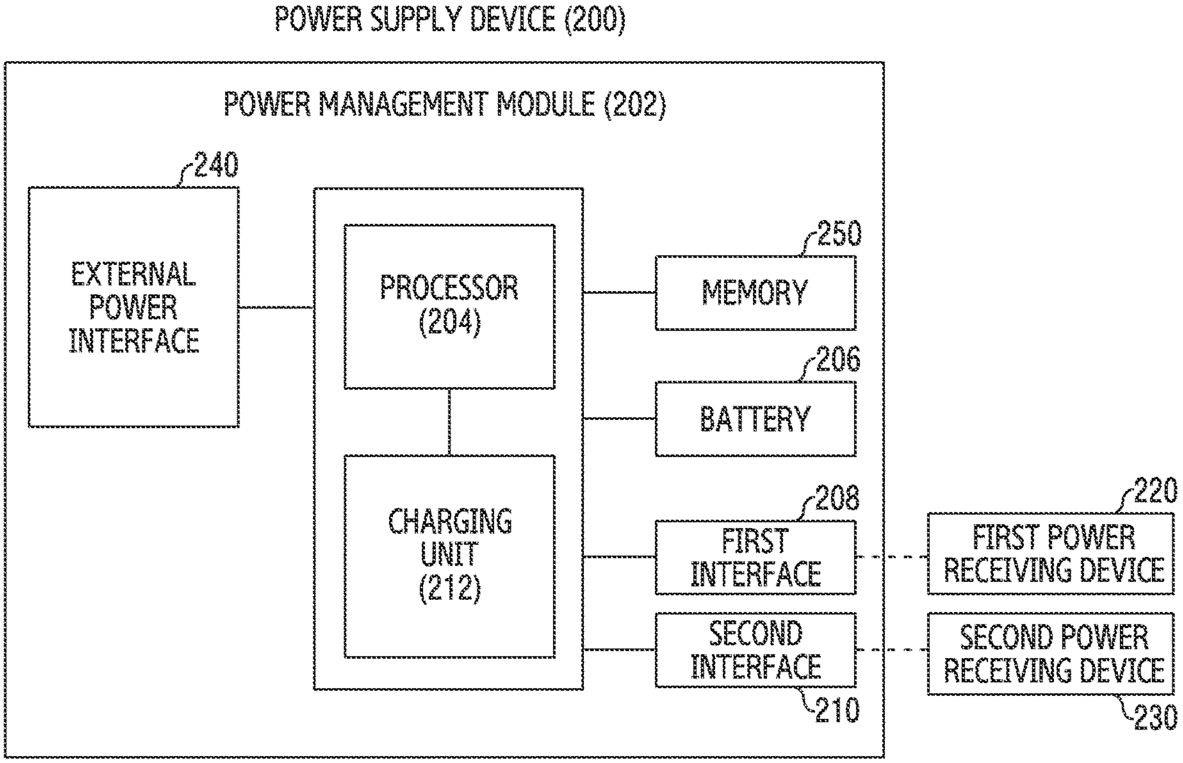
FIG. 2 is a block diagram of a power supply device according to an embodiment of the disclosure.

FIG. 2 is a block diagram of a power supply device according to an embodiment of the disclosure.

Referring to FIG. 2, the power supply device 200 may include a power management module 202, a battery 206, a first interface 208, a second interface 210, an external power interface 240, and a memory 250. The power management module 202 may be referred to as a power management circuit. The power supply device 200 of FIG. 2 may correspond to the power supply device 100 of FIG. 1. The first interface 208 and the second interface 210 of FIG. 2 may correspond to the first interface 106 and the second interface 108 of FIG. 1, respectively. Accordingly, components that correspond to, are the same as or similar to those described in FIG. 1 will not be described.

In an embodiment, the power management module 202 may control power of the power supply device 200 through a processor 204. For example, under control of the processor 204, the power management module 202 may detect that power is supplied through the external power interface 240, and may charge the battery 206 by using the power. In another embodiment, the power management module 202 may control charging of a first power receiving device 220 and a second power receiving device 230 through the processor 204. For example, the power management module 202 may charge the first power receiving device 220 and the second power receiving device 230 by using power of the charged battery 206 under control of the processor 204. In another example, under control of the processor 204, the power management module 202 may detect that power is supplied from an external power device, and may charge the first power receiving device 220 and the second power receiving device 230 by using the power.

In yet another embodiment, the power management module 202 may include the processor 204 and a charging unit 212. In yet another embodiment, the processor 204 may determine a charging voltage for charging the power receiving device 220 and 230. For example, the processor 204 may determine the charging voltage to be 2.8 V, based on SOC information of the power receiving device 220 and 230 that is received from the power receiving device 220 and 230. In yet another embodiment, the processor 204 may convert a voltage of the battery 206 based on the determined charging voltage. For example, in a case in which the voltage of the battery 206 is 3.2 V, the processor 204 may convert the voltage of the battery 206 from 3.2 V to the determined charging voltage, 2.8 V, through a converter.

In yet another embodiment, the processor 204 may control such that an output voltage of the battery 206 bypasses the charging voltage for charging the power receiving device 220 and 230, based on the SOC information received from the power receiving device 220 and 230. For example, in a case in which the output voltage of the battery 206 is 2.8 V or higher, the processor 204 may control the voltage of the battery 206 to maintain 2.8 V and to bypass through a separate circuit without passing through the converter.

In yet another embodiment, the processor 204 may control to step up the output voltage of the battery 206 based on the SOC information received from the power receiving device 220 and 230. For example, in a case in which the output voltage of the battery 206 is 2.8 V and the charging voltage for charging the power receiving device 220 and 230 is 3.0 V, the processor 204 may control to step up the output voltage of the battery 206 from 2.8 V to 3.0 V through the converter.

In yet another embodiment, the charging unit 212 may include a switching circuit and may control charging and discharging of the battery 206 by using the switching circuit. In yet another embodiment, in a case in which power is received from the outside through the external power interface 240, the processor 204 may charge the battery 206 by using the received power. In a case in which power is received from the outside through the external power interface 240, the processor 204 may charge the battery 206 and the first power receiving device 220 connected to the first interface 208 or the second power receiving device 230 connected to the second interface 210, by using the received power.

In yet another embodiment, the processor 204 may receive state of charge (SOC) information of the first power receiving device 220 from the first power receiving device 220 through the first interface 208. In yet another embodiment, the processor 204 may receive SOC information of the second power receiving device 230 from the second power receiving device 230 through the second interface 210. For example, the power management module 202 may be connected with the first interface 208 and/or the second interface 210 through a separate power circuit. The processor 204 may receive SOC information of the first power receiving device 220 and/or the second power receiving device 230 through powerline communication (PLC) which is based on the first interface 208 and/or the second interface 210.

In yet another embodiment, the processor 204 may detect whether the first power receiving device 220 is mounted through the first interface 208, and may detect whether the second power receiving device 230 is mounted through the second interface 210. For example, the processor 204 may detect whether the first power receiving device 220 is mounted by detecting a change of a resistance value through the first interface 208. In yet another embodiment, the processor 204 may detect that the first power receiving device 220 is mounted through the first interface 208, and simultaneously, may receive SOC information of the first power receiving device 220 from the first power receiving device 220. In yet another embodiment, the processor 204 may detect that the first power receiving device 220 is mounted through the first interface 208, and simultaneously, may request SOC information of the first power receiving device 220 from the first power receiving device 220, and may receive the SOC information that is provided from the first power receiving device 220 in response to the request.

In yet another embodiment, the processor 204 may determine at least one charging parameter based on the SOC information that is received from the first power receiving device 220 and the second power receiving device 230. The SOC information received from the power receiving device 220 and 230 may include information related to determination of power to supply to the power receiving device 220 and 230, like at least one of an ID of the power receiving device 220 and 230, a battery voltage, a battery capacity, and a charging mode. The at least one charging parameter determined by the processor 204 may include at least one of a charging voltage, a charging current, an end-of-charge voltage, and an end-of-charge current. In yet another embodiment, in a case in which SOC information including a present SOC value of the first power receiving device 220 is received from the first power receiving device 220, the processor 204 may determine a charging voltage corresponding to the SOC value. In yet another embodiment, in a case in which information regarding a battery capacity of the first power receiving device 220 is received from the first power receiving device 220, the processor 204 may determine a charging current corresponding to the battery capacity. For example, with respect to the first power receiving device 220 having a battery capacity of 50 mAh, the processor 204 may determine the charging current to be 25 mA, and accordingly, may provide a normal charging environment (e.g., a charging speed of 0.5 C). In another example, the processor 204 may determine the charging current to be 40 mA, and accordingly, may provide a quick charging environment (e.g., a charging speed of 0.8 C). C is a unit indicating a current rate (C-rate), and may be determined to correspond to a total capacity of the battery and may refer to a charging speed.

In yet another embodiment, the battery 206 may supply power to at least one of the first power receiving device 220 and the second power receiving device 230. In yet another embodiment, the battery 206 may include a rechargeable secondary cell or a fuel cell.

In yet another embodiment, the memory 250 may store various data that is used by at least one component (e.g., the processor 204) of the power supply device 200. For example, the data may include a charging voltage value corresponding to a SOC value of the power receiving device 220 and 230 that is received from the power receiving device 220 and 230.

According to various embodiments described above, a power supply device (e.g., the power supply device 200 of FIG. 2) may include: a first accommodation unit (e.g., the first accommodation unit 102 of FIG. 1) configured to have a first power receiving device (e.g., the first power receiving device 220 of FIG. 2) mounted therein, and a second accommodation unit (e.g., the second accommodation unit 104 of FIG. 1) configured to have a second power receiving device (e.g., the second power receiving device 230 of FIG. 2) mounted therein, the second power receiving device forming a pair with the first power receiving device; a first interface (e.g., the first interface 208 of FIG. 2) electrically connected with the first power receiving device and disposed in the first accommodation unit; a second interface (e.g., the second interface 210) electrically connected with the second power receiving device and disposed in the second accommodation unit; a battery (e.g., the battery 206 of FIG. 2); and a processor (e.g., the processor 204 of FIG. 2) electrically connected with the first interface, the second interface, and the battery.

In yet another embodiment, the processor may receive first state of charge (SOC) information of the first power receiving device mounted in the first accommodation unit through the first interface, may receive second SOC information of the second power receiving device mounted in the second accommodation unit through the second interface, may determine at least one charging parameter, based on the first SOC information and the second SOC information, and based on the determined at least one charging parameter, may charge the first power receiving device and the second power receiving device through the first interface and the second interface, respectively.

In yet another embodiment, in a case in which it is detected that the first power receiving device is mounted in the first accommodation unit, the processor may request the first SOC information from the first power receiving device through the first interface, and may receive the first SOC information from the first power receiving device.

In yet another embodiment, in a case in which the first SOC information is received through the first interface, the processor may determine a first charging voltage corresponding to the first SOC information, and in a case in which third SOC information that is higher than the first SOC information is received through the first interface, the processor may determine a third charging voltage which corresponds to the third SOC information and is higher than the first charging voltage.

In yet another embodiment, the at least one parameter may be converted in response to the first SOC information and the second SOC information.

In an embodiment, in a case in which charging from an external power device (e.g., the USB connector 700 or the wireless charger 710 of FIG. 7) is detected, the processor may transmit charging information of the external power device to the first power receiving device through the first interface.

In yet another embodiment, the charging information of the external power device may include quick charging information.

In yet another embodiment, in a case in which the first SOC information received through the first interface and the second SOC information received through the second interface are different, the processor may determine a first charging voltage on the first SOC information with respect to the first power receiving device, may determine a second charging voltage on the second SOC information with respect to the second power receiving device, and based on the first charging voltage and the second charging voltage, may charge the first power receiving device and the second power receiving device through the first interface and the second interface, respectively.

In an embodiment, in a case in which the first SOC information (e.g., a battery voltage, a level, and a battery remaining capacity) of the first power receiving device is lower than the second SOC information of the second power receiving device, the processor may determine the first charging voltage to be higher than the second charging voltage.

In yet another embodiment, the processor may determine a communication timing to perform power line communication with the first power receiving device by using the first interface while charging the first power receiving device.

In yet another embodiment, the processor may identify a first charging section in which the power line communication is not performed with the first power receiving device, and a second charging section in which the power line communication is performed with the first power receiving device, based on the communication timing.

In yet another embodiment, in the first charging section, the processor may charge the first power receiving device based on a first charging voltage corresponding to the first SOC information, and in the second charging section, the processor may charge the first power receiving device based on a fourth charging voltage which is higher than the first charging voltage.

In yet another embodiment, in a third charging section from a time when it is detected that the first power receiving device is mounted in the first accommodation unit until a time when initial performance of the power line communication with the first power receiving device is completed, the processor may charge the first power receiving device based on a charging voltage of a designated level.

In yet another embodiment, with respect to a charging section after the third charging section, the processor may identify a fourth charging section in which the power line communication is not performed with the first power receiving device, and a fifth charging section in which the power line communication is performed with the first power receiving device, based on the communication timing.

In yet another embodiment, in the fourth charging section, the processor may charge the first power receiving device based on a first charging voltage corresponding to the first SOC information, and in the fifth charging section, the processor may charge the first power receiving device based on a fourth charging voltage which is higher than the first charging voltage and is of a level that is the same as or different from the charging voltage of the designated level.

Figure 3:
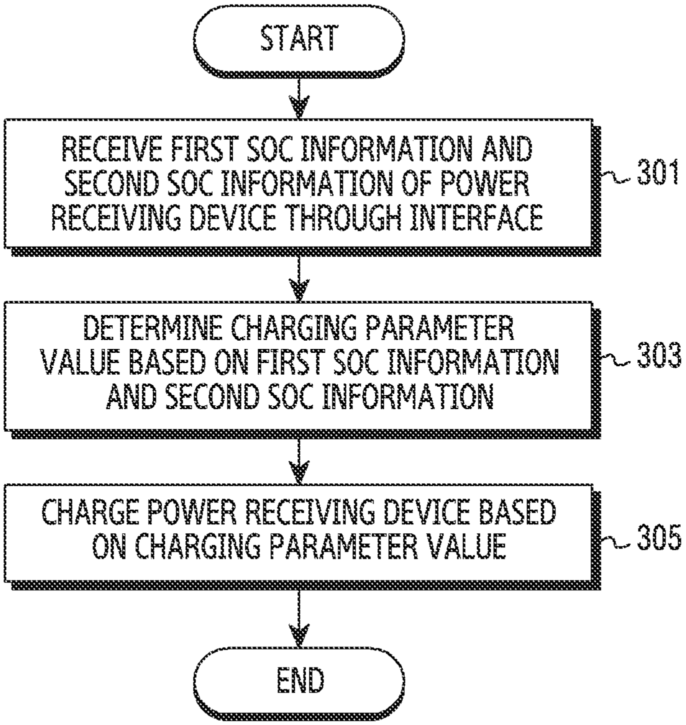
FIG. 3 is a flowchart for controlling charging by a power supply device based on SOC information according to an embodiment of the disclosure.

FIG. 3 is a flowchart for controlling charging by a power supply device based on SOC information according to an embodiment of the disclosure.

Referring to FIG. 3, in operation 301, a power supply device (e.g., the power supply device 200 of FIG. 2) may receive first SOC information of a first power receiving device (e.g., the first power receiving device 220 of FIG. 2) through a first interface (e.g., the first interface 208 of FIG. 2), and may receive second SOC information of a second power receiving device (e.g., the second power receiving device 230 of FIG. 2) through a second interface (e.g., the second interface 210 of FIG. 2). In an embodiment, in a case in which charging environments and using conditions of the first power receiving device 220 and the second power receiving device 230 are substantially the same, the first SOC information and the second SOC information may include the same SOC value. For example, in a case in which the SOC value of the first power receiving device 220 and the second power receiving device 230 is 30%, the first SOC information and the second SOC information received from the first power receiving device 220 and the second power receiving device 230 may include information indicating "30% battery left." In another embodiment, in a case in which at least one of a component constituting the first power receiving device 220 and the second power receiving device 230, a charging environment, and a using condition is different, the first SOC information and the second SOC information may include different SOC values. For example, in a case in which a SOC value of the first power receiving device 220 is 25% and a SOC value of the second power receiving device 230 is 60%, the first SOC information received from the first power receiving device 220 may include information indicating "25% battery left," and the second SOC information received from the second power receiving device 230 may include information indicating "60% battery left." In yet another embodiment, in a case in which the power supply device 200 includes two LED display lamps (e.g., the LED display lamp 130 of FIG. 1), an LED display lamp corresponding to the first power receiving device 220 may output a signal (e.g., red light) which is based on the first SOC information, and an LED display lamp corresponding to the second power receiving device 230 may output a signal (e.g., green light) which is based on the second SOC information.

In yet another embodiment, in operation 303, the power supply device 200 may determine a charging parameter value based on the first SOC information and the second OSC information which are received. In yet another embodiment, in operation 305, the power supply device 200 may charge the first power receiving device 220 and the second power receiving device 230, based on the determined charging parameter value. For example, in a case in which the SOC value of the SOC information received from the first power receiving device 220 and the second power receiving device 230 is 30%, the power supply device 200 may determine a charging voltage corresponding to the SOC value of 30% to be 2.8 V, and may charge the first power receiving device 220 and the second power receiving device 230 by using the charging voltage of 2.8 V.

Figure 4:
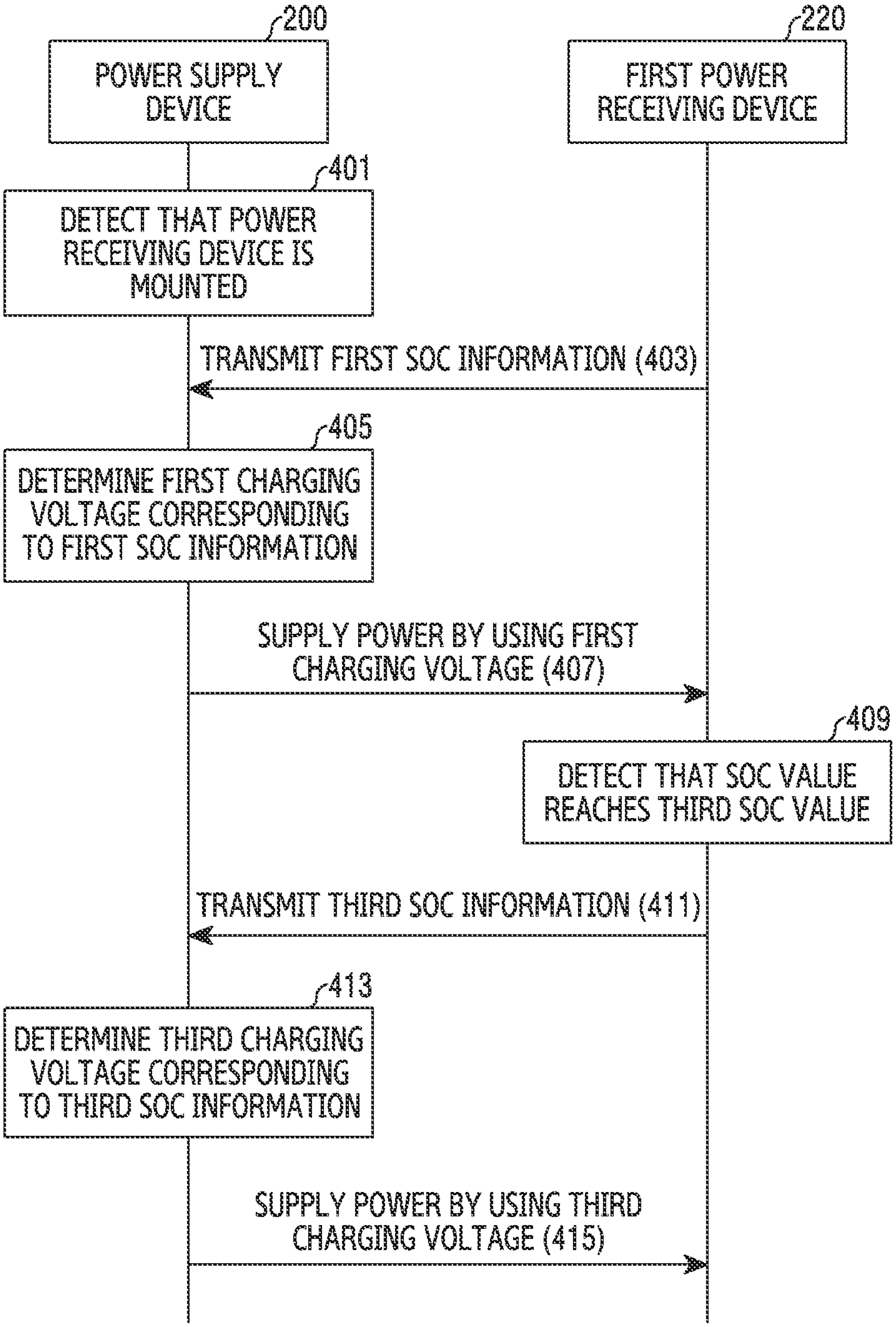
FIG. 4 is a flowchart for controlling charging between a power supply device and a first power receiving device according to an embodiment of the disclosure.

FIG. 4 is a flowchart for controlling charging between a power supply device and a first power receiving device according to an embodiment of the disclosure. Regarding FIG. 4, components which correspond to, are the same as, or similar to those described above will not be described. Descriptions of FIG. 4 may be applied not only to the first power receiving device but also to a second power receiving device.

Referring to FIG. 4, in operation 401, the power supply device 200 may detect that the first power receiving device 220 is mounted. For example, the power supply device 200 may detect that the first power receiving device 220 is mounted by detecting a resistance change of a first interface (e.g., the first interface 208 of FIG. 2). In another embodiment, the power supply device 200 may display information regarding whether the first power receiving device 220 is mounted and a charging state through an LED display lamp (e.g., the LED display lamp 130 of FIG. 1). In yet another embodiment, the power supply device 200 may charge from a time when it is detected that the first power receiving device 220 is mounted.

In yet another embodiment, in operation 403, the power supply device 200 may receive first SOC information from the first power receiving device 220 through the first interface 208. In yet another embodiment, the first SOC information may include at least one of a first SOC value of the first power receiving device 220 and a battery voltage of the first power receiving device 220. For example, the power supply device 200 may identify at least one of the first SOC value (e.g., 75%) and the battery voltage (e.g., 4.0 V) of the first power receiving device 220 through the first SOC information. In yet another embodiment, the power supply device 200 may identify that the first power receiving device 220 is being charged in a present constant current (CC) section, based on the first SOC information. The CC section refers to a section in which the first power receiving device 220 is charged with the same charging current until the battery voltage of the first power receiving device 220 reaches a pre-set full charging voltage (e.g., 4.15 V).

In yet another embodiment, in operation 405, the power supply device 200 may determine a first charging voltage corresponding to the first SOC information. In yet another embodiment, the power supply device 200 may determine a voltage which corresponds to the first SOC value and is higher than the battery voltage of the first power receiving device 220 as the first charging voltage. For example, the power supply device 200 may determine 4.2 V which corresponds to the first SOC value (e.g., 75%) of the first power receiving device 220 and is higher than the battery voltage (e.g., 4.0 V) of the first power receiving device 220, as the first charging voltage, based on the first SOC information. In yet another embodiment, in operation 407, the power supply device 200 may charge the first power receiving device 220 with the first charging voltage through the first interface 208. The power supply device 200 may output 4.2 V which is the first charging voltage, and may supply power to the first power receiving device 220. In yet another embodiment, the power supply device 200 may repeat operations 403 to 407 until the SOC value of the first power receiving device 220 reaches a designated third SOC value.

In yet another embodiment, in operation 409, the first power receiving device 220 may detect that the SOC value of the first power receiving device 220 reaches the designated third SOC value. In yet another embodiment, the third SOC value may refer to a SOC value at a time when the battery voltage of the first power receiving device 220 reaches a pre-set full charging voltage. However, according to various embodiments, the third SOC value may refer to another SOC value which is set according to setting of a user, certain setting of a device, setting of a manufacturer, setting of an application, etc.

In yet another embodiment, in operation 411, the power supply device 200 may receive third SOC information or information indicating that the SOC value of the first power receiving device 220 reaches the third SOC value from the first power receiving device 220 through the first interface 208. In yet another embodiment, the third SOC information may include at least one of the third SOC value of the first power receiving device 220 and the battery voltage of the first power receiving device 220. For example, the power supply device 200 may identify at least one of the third SOC value (e.g., 98%) and the battery voltage (e.g., 4.15 V) of the first power receiving device 220 through the third SOC information. In yet another embodiment, the power supply device 200 may identify that the first power receiving device 220 enters a present constant voltage (CV) section, based on the third SOC information. The constant voltage (CV) section may refer to a section in which the battery voltage of the first power receiving device 220 reaches the pre-set full charging voltage and then charging is performed while maintaining the full charging voltage.

In yet another embodiment, in operation 413, the power supply device 200 may determine a third charging voltage corresponding to the third SOC information. In yet another embodiment, the power supply device 200 may determine a voltage that corresponds to the third SOC value and is higher than the battery full charging voltage of the first power receiving device 220, as the third charging voltage. For example, the power supply device 200 may determine 4.35 V which corresponds to the third SOC value (e.g., 98%) of the first power receiving device 220 and is higher than the battery full charging voltage (e.g., 4.15 V) of the first power receiving device 220, as the third charging voltage, based on the third SOC information. In yet another embodiment, in operation 415, the power supply device 200 may charge the first power receiving device 220 with the third charging voltage through the first interface 208. The power supply device 200 may output 4.35 V which is the third charging voltage, and may supply power to the first power receiving device 220. In yet another embodiment, the power supply device 200 may maintain the third charging voltage until charging of the battery of the first power receiving device 220 is completed (e.g., until the SOC value of the first power receiving device 220 reaches 100%).

Figure 5:
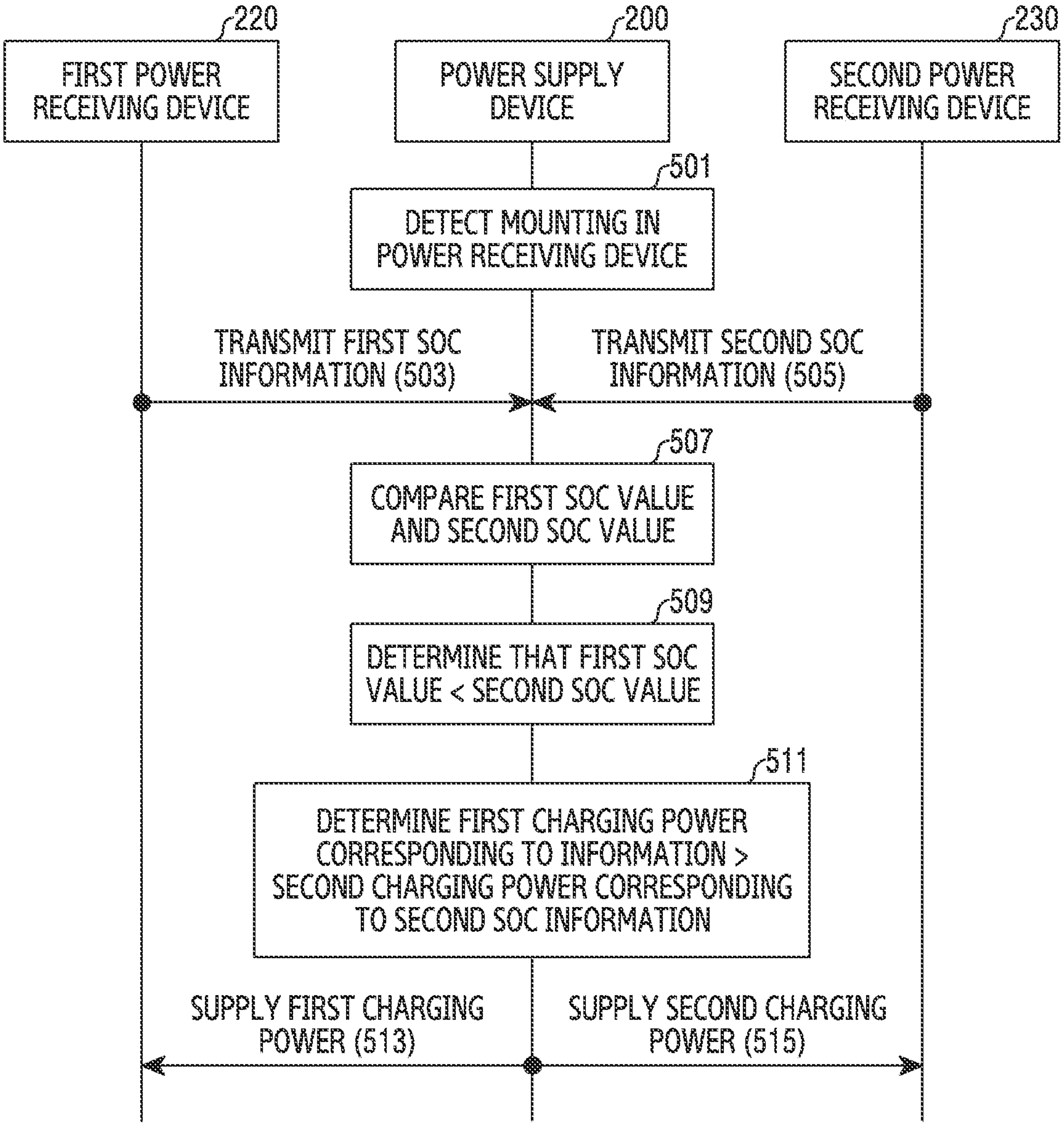
FIG. 5 is a flowchart for controlling charging by a power supply device when SOC values are different between a first power receiving device and a second power receiving device according to an embodiment of the disclosure.

FIG. 5 is a flowchart for controlling charting by a power supply device in a case in which there is a difference in SOC values between a first power receiving device and a second power receiving device according to an embodiment of the disclosure. Regarding FIG. 5, components which correspond to, are the same as, or similar to those described above will not be described.

Referring to FIG. 5, in operation 501, the power supply device 200 may detect that the first power receiving device 220 and the second power receiving device 230 are mounted. In an embodiment, the power supply device 200 may charge the first power receiving device 220 and the second power receiving device 230 from a time when it is detected that the first power receiving device 220 and the second power receiving device 230 are mounted.

In another embodiment, in operation 503, the power supply device 200 may receive first SOC information from the first power receiving device 220 through a first interface (e.g., the first interface 208 of FIG. 2). In yet another embodiment, in operation 505, the power supply device 200 may receive second SOC information from the second power receiving device 230 through a second interface (e.g., the second interface 210 of FIG. 2). In yet another embodiment, the first SOC information and the second SOC information may include different SOC values. For example, a first SOC value of the first power receiving device 220 included in the first SOC information, and a second SOC value of the second power receiving device 230 included in the second SOC information may be different based on at least one of a component constituting the first power receiving device 220 and the second power receiving device 230, a charging environment and a using condition.

In yet another embodiment, in operation 507, the power supply device 200 may compare the first SOC value included in the received first SOC information and the second SOC value included in the second SOC information. In yet another embodiment, in operation 509, the power supply device 200 may determine that the first SOC value is smaller than the second SOC value. For example, in a case in which the first SOC value of the first power receiving device is 20% and the second SOC value of the second power receiving device 230 is 45%, the power supply device 200 may determine that the first SOC information has a SOC value smaller than the second SOC information.

In yet another embodiment, the power supply device 200 may determine a first charging current and a first charging voltage with respect to a first charging power corresponding to the first SOC value. The power supply device 200 may determine a second charging current and a second charging voltage with respect to a second charging power corresponding to the second SOC value. In yet another embodiment, in operation 511, the power supply device 200 may determine the first charging power on the first SOC information to be higher than the second charging power on the second SOC information. In yet another embodiment, the power supply device 200 may determine the first charging voltage on the first SOC information to be lower than the second charging voltage on the second SOC information. For example, the power supply device 200 may determine the first charging voltage on the first SOC information (e.g., the first SOC value of 20%) to be 3.2 V, and may determine the second charging voltage on the second SOC information (e.g., the second SOC value of 45%) to be 3.4 V which is higher than the first charging voltage. In yet another embodiment, in order to determine the first charging power on the first power receiving device 220 to be higher than the second charging power on the second power receiving device 230, the power supply device 200 may determine the first charging current to be higher than the second charging current. For example, in a case in which the first charging voltage on the first SOC information is determined to be 3.2 V and the second charging voltage on the second SOC information is determined to be 3.4 V, the power supply device 200 may determine the first charging current to be 100 mA and may determine the second charging current to be 40 mA.

In yet another embodiment, in operation 513, the power supply device 200 may charge the first power receiving device 220 with the first charging power. In yet another embodiment, in operation 515, the power supply device 200 may charge the second power receiving device 230 with the second charging power which is lower than the first charging power.

FIG. 5 illustrates the power supply device 200 which controls a charging current and a charging voltage in a case in which the first power receiving device 220 and the second power receiving device 230 has different SOC values, but in another embodiment, the power supply device 200 may control a charging order. For example, in a case in which the SOC value of the first power receiving device 220 is smaller than the SOC value of the second power receiving device 230, the power supply device 200 may charge the first power receiving device 220 first. After that, at a time in a case in which the SOC value of the first power receiving device 220 is the same as the SOC value of the second power receiving device 230, the power supply device 200 may charge the first power receiving device 220 and the second power receiving device 230, simultaneously, with a charging current and a charging voltage corresponding to the corresponding SOC value.

According to various embodiments described above, an operating method of a power supply device (e.g., the power supply device 100 of FIG. 1 or the power supply device 200 of FIG. 2) may include: receiving first state of charge (SOC) information of a first power receiving device (e.g., the first power receiving device 220 of FIG. 2) mounted in a first accommodation unit (e.g., the first accommodation unit 102 of FIG. 1) through a first interface (e.g., the first interface 208 of FIG. 2); receiving second SOC information of a second power receiving device (e.g., the second power receiving device 230 of FIG. 2) mounted in a second accommodation unit (e.g., the second accommodation unit 104 of FIG. 1) through a second interface (e.g., the second interface 210 of FIG. 2); determining at least one charging parameter, based on the first SOC information and the second SOC information; and based on the determined at least one charging parameter, charging the first power receiving device and the second power receiving device through the first interface and the second interface, respectively.

In yet another embodiment, the operating method of the power supply device may further include, in a case in which it is detected that the first power receiving device is mounted in the first accommodation unit, requesting the first SOC information from the first power receiving device through the first interface, and receiving the first SOC information from the first power receiving device.

In yet another embodiment, the operating method of the power supply device may further include: when the first SOC information is received through the first interface, determining a first charging voltage corresponding to the first SOC information; and when third SOC information which is higher than the first SOC information is received through the first interface, determining a third charging voltage which corresponds to the third SOC information and is higher than the first charging voltage.

In yet another embodiment, the at least one parameter may be converted in response to the first SOC information and the second SOC information.

In yet another embodiment, the operating method of the power supply device may further include, when charging from an external power device is detected, transmitting charging information of the external power device to the first power receiving device through the first interface.

In yet another embodiment, the operating method of the power supply device may further include: when the first SOC information received through the first interface and the second SOC information received through the second interface are different, determining a first charging voltage on the first SOC information with respect to the first power receiving device; determining a second charging voltage on the second SOC information with respect to the second power receiving device; and based on the first charging voltage and the second charging voltage, charging the first power receiving device and the second power receiving device through the first interface and the second interface, respectively.

In yet another embodiment, the operating method of the power supply device may further include, when the first SOC information of the first power receiving device is lower than the second SOC information of the second power receiving device, determining the first charging voltage to be higher than the second charging voltage.

Figure 6:
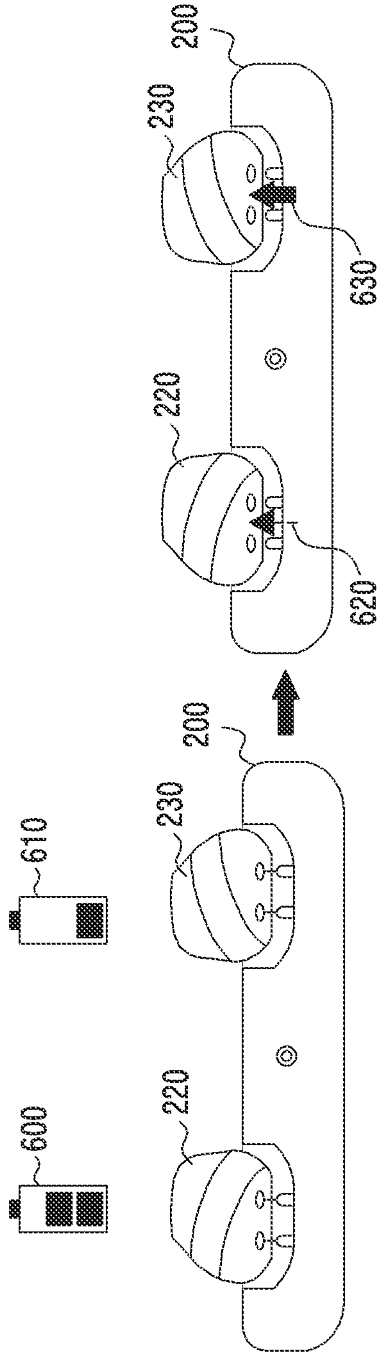
FIG. 6 is a view illustrating a power supply state of a power supply device when SOC values are different between a first power receiving device and a second power receiving device according to an embodiment of the disclosure.

FIG. 6 illustrates a power supply state of a power supply device when respective SOC values of a first power receiving device and a second power receiving device are different according to an embodiment of the disclosure. Regarding FIG. 6, components which correspond to, are the same as, or similar to those described above will not be described.

Referring to FIG. 6, a battery of the first power receiving device 220 may indicate a first SOC value 600, and a battery of the second power receiving device 230 may indicate a second SOC value 610. In an embodiment, the first SOC value 600 of the first power receiving device 220 and the second SOC value 610 of the second power receiving device 230 may be displayed through a display of an electronic device (e.g., a smartphone). For example, in a case in which the power supply device 200 having the first power receiving device 220 and the second power receiving device 230 mounted therein is connected with the electronic device through short-range communication (e.g., Bluetooth), the electronic device may display a SOC value of the power supply device 200, the first SOC value 600 of the first power receiving device 220, and the second SOC value 610 of the second power receiving device 230 on the display, through an application interlocking with the power receiving devices 220 and 230.

In another embodiment, the first SOC value 600 and the second SOC value 610 may have different values. For example, in a case in which the first power receiving device 220 is mounted in the power supply device 200 and only the second power receiving device 230 operates, the second SOC value 610 may be lower than the first SOC value 600.

In yet another embodiment, in a case in which the first power receiving device 220 and the second power receiving device 230 having different SOC values are mounted in the power supply device 200, the power supply device 200 may supply a first charging power 620 and a second charging power 630 which are different from each other to the first power receiving device 220 and the second power receiving device 230. For example, in a case in which the second SOC value 610 is lower than the first SOC value 600, the power supply device 200 may determine the second charging power 630 to be higher than the first charging power 620. In order to determine the second charging power 630 to be higher than the first charging power 620, the power supply device 200 may determine a second charging current to be supplied to the second power receiving device 230 to be higher than a first charging current to be supplied to the first power receiving device 220.

FIG. 6 only illustrates the power supply device 200 which controls a charging current and a charging voltage in a case in which the first power receiving device 220 and the second power receiving device 230 are simultaneously mounted. However, in yet another embodiment, the power supply device 200 may control a charging current and a charging voltage in a case in which the first power receiving device 220 and the second power receiving device 230 are mounted at different times. In yet another embodiment, at a first time, only the second power receiving device 230 having a second SOC value (e.g., 30%) may be mounted in the power supply device 200. The power supply device 200 may determine a second charging voltage (e.g., 2.8 V) corresponding to the second SOC value (e.g., 30%), and may supply power to the second power receiving device 230 by using the second charging voltage. In this case, a second charging current of the power supply device 200 for the second power receiving device 230 may be 40 mA. Thereafter, at a second time after the first time, the first power receiving device 220 having a first SOC value (e.g., 75%) may also be mounted in the power supply device 200. The power supply device 200 may compare the first SOC value (e.g., 75%) and the second SOC value (e.g., 30%). In yet another embodiment, in a case in which the first SOC value (e.g., 75%) is higher than the second SOC value (e.g., 30%), the power supply device 200 may determine by changing the second charging current (e.g., from 40 mA to 100 mA) while maintaining the second charging voltage (e.g., 2.8 V).

Figure 7:
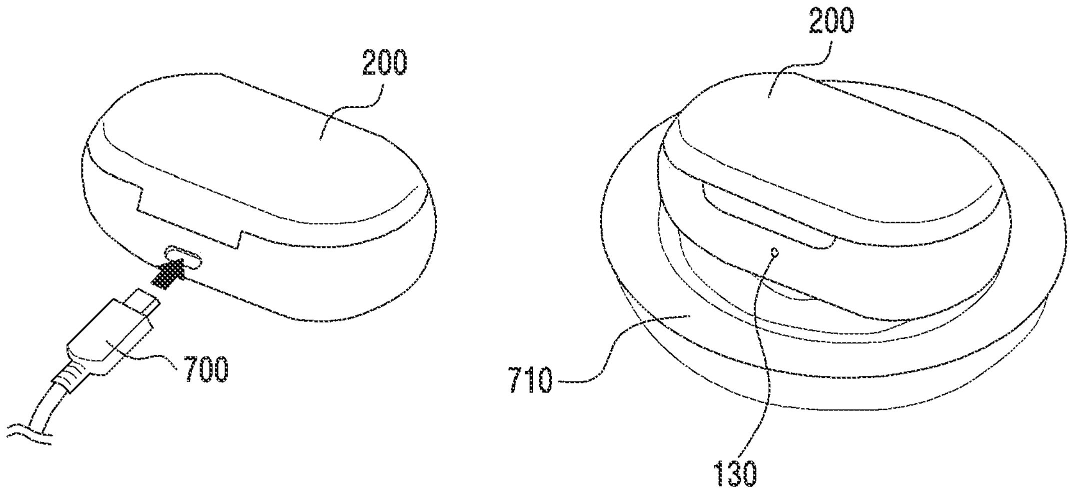
FIG. 7 is a view illustrating a state in which charging from an external power device is detected in a power supply device according to an embodiment of the disclosure.

FIG. 7 illustrates a state in which charging from an external power device is detected in a power supply device according to an embodiment of the disclosure.

Referring to FIG. 7, the power supply device 200 may charge a battery (e.g., the battery 206 of FIG. 2) by using power supplied from the external power device. In an embodiment, the power supply device 200 may charge a first power receiving device (e.g., the first power receiving device 220 of FIG. 2) and a second power receiving device (e.g., the second power receiving device 230 of FIG. 2) by using power supplied from the external power device. In another embodiment, the power supply device 200 may select a charging method according to a type of the external power device. The power supply device 200 may receive power through a USB connector 700, or may receive power through a wireless charger 710. For example, in a case in which the power supply device 200 receives power through the USB connector 700, the power supply device 200 may select a quick charging method. In another example, in a case in which the power supply device 200 receives power through the wireless charger 710, the power supply device 200 mays elect a normal charging method. However, this should not be considered as limiting, and the power supply device 200 may select a normal charging method even when receiving power through the USB connector 700, and may select a quick charging method even when receiving power through the wireless charger 710.

In yet another embodiment, in a case in which charging from the external power devices 700 and 710 is detected, the power supply device 200 may display a state of the battery 206 of the power supply device 200 through an LED display lamp 130. For example, in a case in which power is supplied to the power supply device 200 from the external power devices 700 and 710, a signal (e.g., green light, red light, or yellow light) indicating a charging state (e.g., a fully charged state, a charging-in-progress state, or a SOC value) of the power supply device 200 may be outputted.

Figure 8:
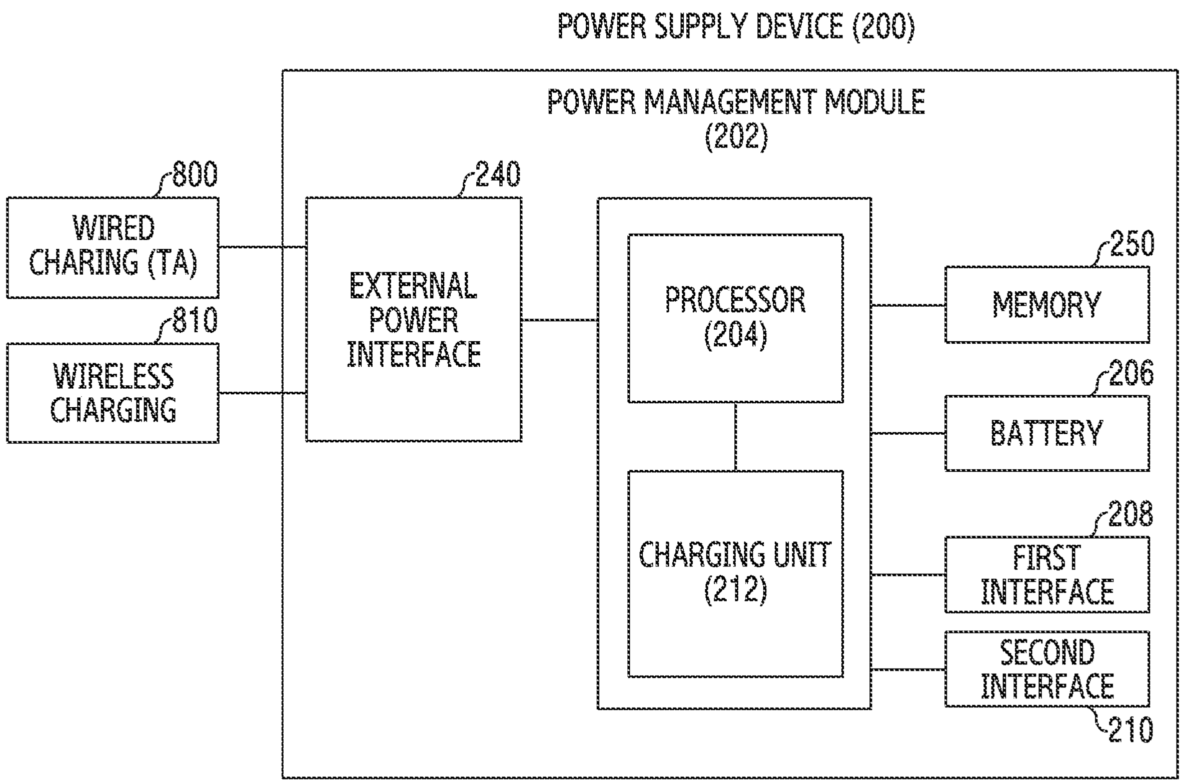
FIG. 8 is a view illustrating a state in which power is supplied through an external power device according to an embodiment of the disclosure.

FIG. 8 illustrates a state in which power is supplied through an external power device according to an embodiment of the disclosure.

Referring to FIG. 8, a processor 204 of a power supply device 200 may detect whether power is supplied from an external power device. For example, an external power interface 240 may include a wired power interface such as a USB and a wireless power interface such as a coil antenna. For example, the processor 204 may detect that power is supplied from an external source by detecting wired charging 800 through the wired power interface of the power supply device 200. In another example, the processor 204 may detect that power is supplied from an external source by detecting wireless charging 810 through the wireless power interface of the power supply device 200.

In an embodiment, a charging unit 212 may charge a battery 206 by using power supplied through the wired charging 800 or wireless charging 810. In an embodiment, the charging unit 212 may transmit a data signal of a high frequency band including charging detection information of the external power device to a power receiving device (e.g., the first power receiving device 220, the second power receiving device 230 of FIG. 2) through a first interface 208 and a second interface 210.

Figure 9:
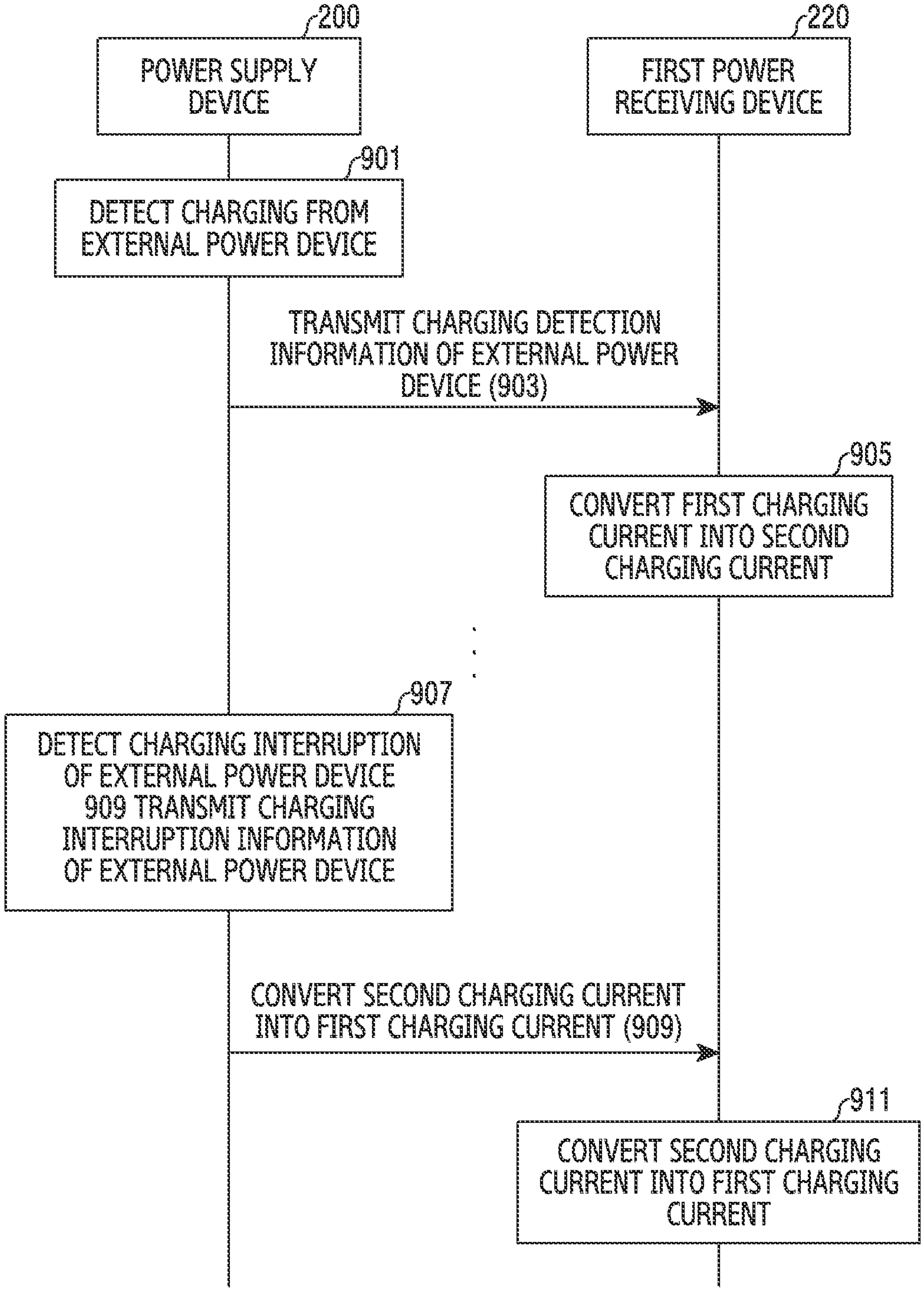
FIG. 9 is a flowchart for controlling charging between a power supply device which detects charging from an external power device, and a power receiving device according to an embodiment of the disclosure.

FIG. 9 illustrates a flowchart for controlling charging between a power supply device which detects charging by an external power device, and a power receiving device according to an embodiment of the disclosure. Regarding FIG. 9, components which correspond to, are the same as, or similar to those described above will not be described.

Referring to FIG. 9, in operation 901, the power supply device 200 having a first power receiving device 220 mounted therein may detect charging from the external power device (e.g., the USB connector 700, the wireless charger 710 of FIG. 7). In an embodiment, in operation 903, the power supply device 200 may transmit charging detection information of the external power devices 700 and 710 to the first power receiving device 220. In an embodiment, the charging detection information of the external power devices 700 and 710 may include quick charging information. In an embodiment, in operation 905, the first power receiving device 220 may convert a charging current value from a first charging current to a second charging current which is higher than the first charging current. For example, in a case in which power is supplied to the power supply device 200 from a USB connector supporting quick charging, the first power receiving device 220 may convert the first charging current (e.g., 25 mA) in a normal charging environment (e.g., a charging speed of 0.5 C) to the second charging current (e.g., 40 mA) in a quick charging environment (e.g., a charging speed of 0.8 C).

In an embodiment, in operation 907, the power supply device 200 may detect that charging from the external power devices 700 and 710 is interrupted. In an embodiment, in operation 909, the power supply device 200 may transmit charging interruption information of the external power devices 700 and 710 to the first power receiving device 220. In operation 911, the first power receiving device 220 may convert the second charging current to the first charging current which is lower than the second charging current.

FIG. 9 illustrates only a case in which charging from the external power device is detected in a case in which the first power receiving device 220 is mounted in the power supply device 200, but in another embodiment, the first power receiving device 220 may be mounted after the power supply device 200 detects charging from the external power devices 700 and 710. In an embodiment, the first power receiving device 220 may set an initial charging current value (e.g., 25 mA) to the second charging current (e.g., 40 mA) in the quick charging environment.

Figure 10:
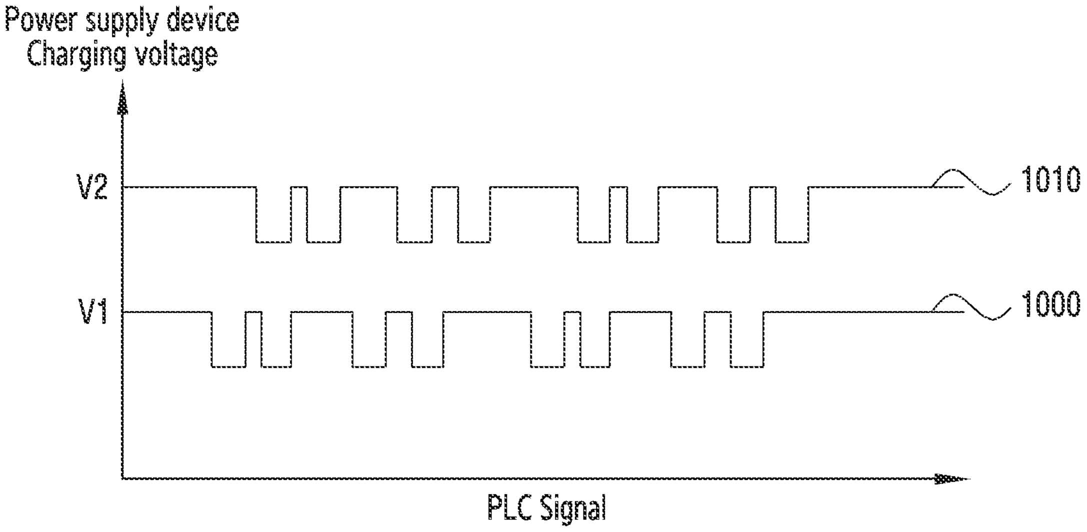
FIG. 10 is a view illustrating a graph indicting a PLC signal according to a charging voltage of a power supply device according to an embodiment of the disclosure.

FIG. 10 illustrates a graph showing a PLC signal according to a charging voltage of a power supply device according to an embodiment of the disclosure.

Referring to FIG. 10, the power supply device (e.g., the power supply device 200 of FIG. 2) may receive first SOC information from a power receiving device (e.g., the first power receiving device 220 or the second power receiving device 230 of FIG. 2) through power line communication (PLC). In an embodiment, a processor (e.g., the processor 204 of FIG. 2) of the power supply device 200 may determine a first charging voltage V1 based on the first SOC information. The processor 204 may transmit a data signal regarding the first charging voltage V1 to a charging unit (e.g., the charging unit 212 of FIG. 2). In an embodiment, the processor 204 may generate a first PLC signal 1000. In an embodiment, the processor 204 may supply power by transmitting the first PLC signal 1000 the power receiving device 220 or 230.

In an embodiment, the power supply device 200 may receive second SOC information which is distinct from the first SOC information from the power receiving device 220 or 230 through the PLC. In an embodiment, the power supply device 200 may receive the second SOC information after receiving the first SOC information from the power receiving device 220 or 230. For example, the power supply device 200 may receive the second SOC information which is refined according to increase of a battery level of the power receiving device 220 or 230 after receiving the first SOC information. In an embodiment, a second SOC value included in the second SOC information may correspond to a value which is larger than a first SOC value included in the first SOC information. In an embodiment, the power supply device 200 may determine a second charging voltage V2 based on the second SOC information. For example, the processor 204 of the power supply device 200 may determine the second charging voltage V2 which is higher than the first charging voltage V1, based on the second SOC information. The processor 204 may transmit a data signal regarding the second charging voltage V2 to the charging unit 212. In an embodiment, the processor 204 may generate a second PLC signal 1010 which is different from the first PLC signal. In an embodiment, the first PLC signal 1000 and the second PLC signal 1010 may correspond to a power signal for supplying power. In an embodiment, the processor 204 may supply power which is higher than the first PLC signal 1000, by transmitting the second PLC signal 1010 to the power receiving device 220 or 230.

Figure 11:
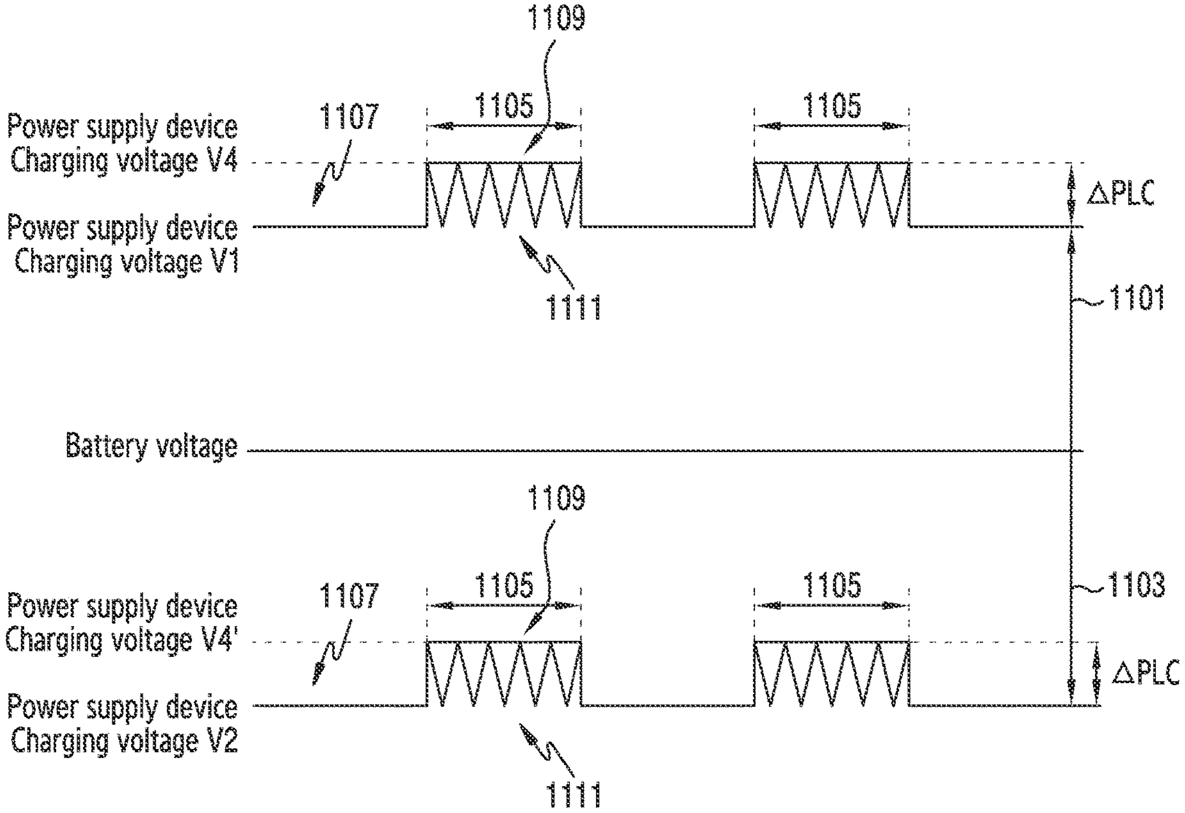
FIG. 11 is a view illustrating a charging voltage of a power supply device in a PLC communication environment according to an embodiment of the disclosure.

FIG. 11 illustrates a charging voltage of a power supply device in a PLC communication environment according to an embodiment of the disclosure.

Referring to FIG. 11, in an operation of charging a power receiving device (e.g., at least one of the first power receiving device 110 and the second power receiving device 120 of FIG. 1) mounted in an accommodation unit (e.g., at least one of the first accommodation unit 102 and the second accommodation unit 104 of FIG. 1), the power supply device (e.g., the power supply device 200 of FIG. 2) according to an embodiment may perform power line communication (PLC) with the power receiving device 110 and/or 120. For example, the power supply device 200 may perform PLC with the power receiving device 110 and/or 120 electrically connected with an interface 106 and/or 108 based on the mounting, by using a terminal (e.g., a terminal for data communication) included in an interface (e.g., at least one of the first interface 106 and the second interface 108 of FIG. 1) of the power supply device 200. According to an embodiment, the power supply device 200 may receive data from the power receiving device 110 and/or 120 based on the PLC. For example, the power supply device 200 may receive SOC information including information regarding at least one of a state of charge (SOC) value and a battery capacity of the power receiving device 110 and/or 120 from the power receiving device 110 and/or 120 by using the PLC.

In an embodiment, the power supply device 200 may determine a timing of PLC to perform with the power receiving device 110 and/or 120 while charging the power receiving device 110 and/or 120. In this regard, the power supply device 200 may transmit, to the power receiving device 110 and/or 120, a signal or data requesting the power receiving device 110 and/or 120 to provide data corresponding to the SOC information, by using the PLC. The power supply device 200 may receive data regarding the SOC information which is transmitted from the power receiving device 110 and/or 120 according to a designated period in response to the request, and may determine a timing 1105 of PLC based on a reception period of the data regarding the SOC information.

In an embodiment, in the operation of charging the power receiving device 110 and/or 120, the power supply device 200 may apply a margin of a designated voltage level to a predetermined charging voltage, by considering power consumed for PLC with the power receiving device 110 and/or 120. In this regard, the power supply device 200 may identify a first charging section 1107 in which PLC is not performed and a second charging section 1109 in which PLC is performed, based on the timing 1105 of the PLC, while charging the power receiving device 110 and/or 120.

According to an embodiment, in the first charging section 1107, the power supply device 200 may charge the power receiving device 110 and/or 120 by using a first charging voltage V1 which is stepped up from a voltage of a battery (e.g., the battery 206 of FIG. 2) (1101) or a second charging voltage V2 which is stepped down from the battery voltage (1103) according to SOC information of the power receiving device 110 and/or 120. Alternatively, in the second charging section 1109 corresponding to the timing 1105 of the PLC, the power supply device 200 may apply a margin (ΔPLC) (e.g., 200 mV or a voltage level within about 5% to 10% of the first charging voltage V1 or the second charging voltage V2) to the first charging voltage V1 or the second charging voltage V2, and may charge the power receiving device 110 and/or 120 based on a fourth charging voltage V4 which is higher than the first charging voltage V1, or a fourth charging voltage V4' which is higher than the second charging voltage V2, according to application of the margin (ΔPLC).

According to various embodiments, the first charging voltage V1 or the second charging voltage V2 that is used by the power supply device 200 to charge the power receiving device 110 and/or 120 in the first charging section 1107 may be determined to be a voltage that is higher than the voltage of the battery of the power receiving device 110 and/or 120.

According to various embodiments, in the operation of charging the power receiving device 110 and/or 120, the power supply device 200 may be electrically connected with an external power device (e.g., the USB connector 700 or the wireless charger 710 of FIG. 7), and may receive power from the external power device 700 or 710. In this case, the power supply device 200 may adjust power supplied from the external power device 700 or 710 (e.g., stepping up a voltage, stepping down a voltage, or applying a margin while stepping up or stepping down a voltage), based on SOC information of the power receiving device 110 and/or 120, and may charge the power receiving device 110 and/or 120 by using the adjusted power (e.g., the stepped-up voltage, the stepped-down voltage, or the stepped-up or stepped-down voltage to which the margin is applied).

According to various embodiments, in the second charging section 1109 corresponding to the timing 1105 of the PLC, the power supply device 200 may convert the fourth charging voltage V4 or V4' (1111) in order to provide a notification regarding performance of the PLC to the power receiving device 110 and/or 120. For example, in a case in which the margin ΔPLC attributable to the fourth charging voltage V4 or V4' is determined to be a designated voltage level of 200 mV, the power supply device 200 may regularly convert the fourth charging voltage V4 or V4' by 200 mV (1111). In another example, in a case in which the margin ΔPLC attributable to the fourth charging voltage V4 or V4' is determined to be a voltage level within about 5% to 10% of the first charging voltage V1 or the second charging voltage V2, the power supply device 200 may irregularly convert the fourth charging voltage V4 or V4' within a voltage level range within about 5% to 10% of the first charging voltage V1 or the second charging voltage V2.

Figure 12:
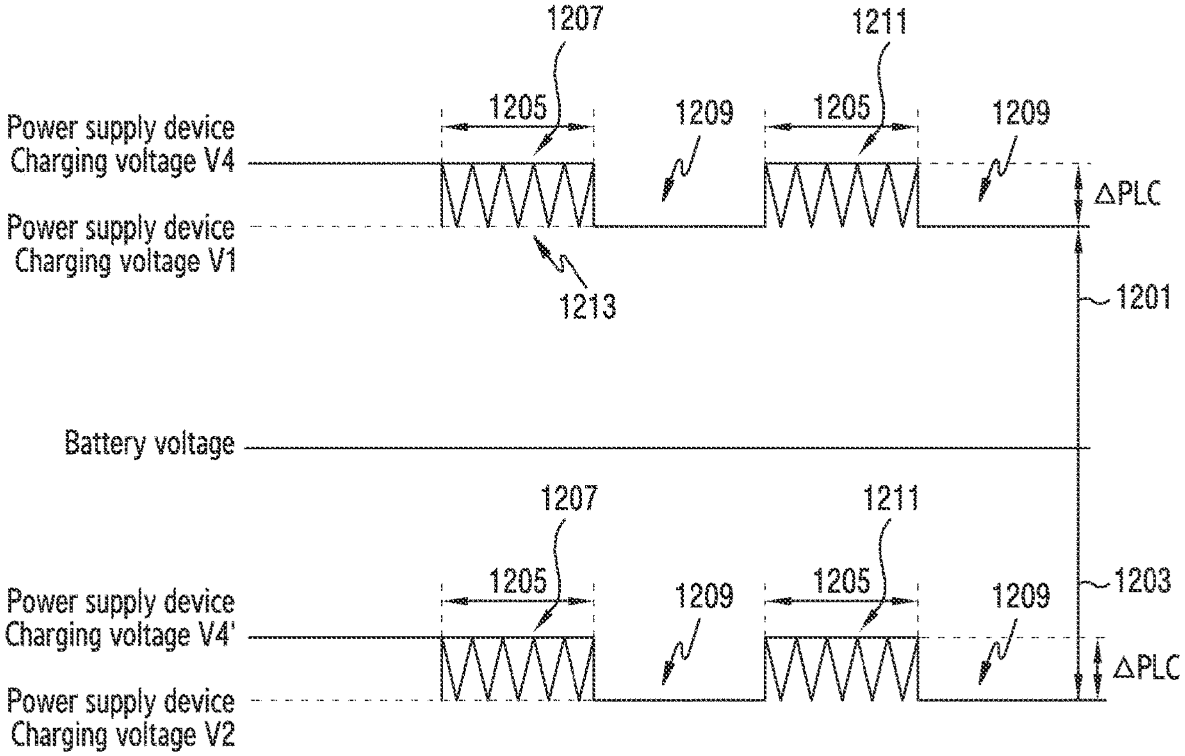
FIG. 12 is a view illustrating a charging voltage of a power supply device in a PLC communication environment according to an embodiment of the disclosure.

FIG. 12 illustrates a charging voltage of a power supply device in a PLC communication environment according to another embodiment of the disclosure.

Referring to FIG. 12, according to an embodiment, a power supply device (e.g., the power supply device 200 of FIG. 2) may detect that a power receiving device (e.g., at least one of the first power receiving device 110 and the second power receiving device 120 of FIG. 1) is mounted in an accommodation unit 102 and/or 104, by detecting a change of a resistance value through an interface (e.g., at least one of the first interface 106 and the second interface 108 of FIG. 1) included in the accommodation unit (e.g., at least one of the first accommodation unit 102 and the second accommodation unit 104 of FIG. 1). In an embodiment, in a case in which it is detected that the power receiving device 110 and/or 120 is mounted, the power supply device 200 may charge the power receiving device 110 and/or 120 based on a fourth charging voltage V4 or V4' of a designated voltage level from a time in a case in which the mounting is detected until a third charging section 1207 in which performance of initial power line communication (PLC) with the power receiving device 110 and/or 120 is completed. According to an embodiment, the fourth charging voltage V4 or V4' used in the third charging section 1207 may be a voltage of a level which is determined by considering charging of the power receiving device 110 and/or 120 and PLC with the power receiving device 110 and/or 120.

According to an embodiment, in the third charging section 1207, the power supply device 200 may transmit, to the power receiving device 110 and/or 120, a signal or data requesting the power receiving device 110 and/or 120 to provide data corresponding to SOC information (e.g., SOC information including information regarding at least one of a SOC value and a battery capacity of the power receiving device 110 and/or 120), by using the PLC. The power supply device 200 may receive data regarding SOC information which is transmitted from the power receiving device 110 and/or 120 according to a designated period in response to the request, and may determine a timing 1205 of the PLC based on a reception period of the data regarding the SOC information. The power supply device 200 may identify a fourth charging section 1209 in which PLC is not performed with the power receiving device 110 and/or 120, and a fifth charging section 1211 in which PLC is performed with the power receiving device 110 and/or 120 in response to the PLC timing 1205, based on the PLC timing 1205.

According to an embodiment, in the fourth charging section 1209, the power supply device 200 may charge the power receiving device 110 and/or 120 by using a first charging voltage V1 which is stepped up from a voltage of a battery (e.g., the battery 206 of FIG. 2) (1201), or a second charging voltage V2 which is stepped down from the voltage of the battery (1203), according to SOC information of the power receiving device 110 and/or 120. According to various embodiments, the first charging voltage V1 or the second charging voltage V2 which is used by the power supply device 200 to charge the power receiving device 110 and/or 120 in the fourth charging section 1209 may be determined to be higher than the voltage of the battery of the power receiving device 110 and/or 120.

According to an embodiment, in the fifth charging section 1211 corresponding to the PLC timing 1205, the power supply device 200 may charge the power receiving device 110 and/or 120 based on the fourth charging voltage V4 which is higher than the first charging voltage V1 or the fourth charging voltage V4' which is higher than the second charging voltage V2, by applying a margin (ΔPLC) (e.g., 200 mV or a voltage level within about 5% to 10% of the first charging voltage V1 or the second charging voltage V2) considering power consumed for PLC to the first charging voltage V1 or the second charging voltage V2. According to an embodiment, the fourth charging voltage V4 or V4' which is used by the power supply device 200 in the fifth charging section 1211 may be the same as the fourth charging voltage V4 or V4' which is used in the third charging section 1207. Based on this, in a charging section (e.g., the third charging section 1207) before the PLC timing 1205 is determined, the power supply device 200 may use a charging voltage of an appropriate level (e.g., the fourth charging voltage V4 or V4') considering charging of the power receiving device 110 and/or 120 and PLC with the power receiving device 110 and/or 120, and in a case in which the PLC timing 1205 is determined thereafter, the power supply device 200 may use the charging voltage of the appropriate level (e.g., the fourth charging voltage V4 or V4') which is previously used in a charging section (e.g., the fifth charging section 1211) corresponding to the PLC timing 1205.

According to various embodiments, in the operation of charging the power receiving device 110 and/or 120, the power supply device 200 may be electrically connected with an external power device (e.g., the USB connector 700 or the wireless charger 710 of FIG. 7), and may receive power from the external power device 700 or 710. In this case, the power supply device 200 may adjust power supplied from the external power device 700 or 710 (e.g., stepping up a voltage, stepping down a voltage, or applying a margin while stepping up or stepping down a voltage), based on SOC information of the power receiving device 110 and/or 120, and may charge the power receiving device 110 and/or 120 by using the adjusted power (e.g., the stepped-up voltage, the stepped-down voltage, or the stepped-up or stepped-down voltage to which the margin is applied).

According to various embodiments, in the fifth charging section 1211 corresponding to the PLC timing 1205, the power supply device 200 may convert the fourth charging voltage V4 or V4' (1213) in order to provide a notification regarding performance of the PLC to the power receiving device 110 and/or 120. For example, in a case in which the margin ΔPLC attributable to the fourth charging voltage V4 or V4' in the fifth charging section 1211 is determined to be a designated voltage level of 200 mV, the power supply device 200 may regularly convert the fourth charging voltage V4 or V4' by 200 mV (1213). In another example, in a case in which the margin ΔPLC attributable to the fourth charging voltage V4 or V4' in the fifth charging section 1211 is determined to be a voltage level within about 5% to 10% of the first charging voltage V1 or the second charging voltage V2, the power supply device 200 may irregularly convert the fourth charging voltage V4 or V4' within a voltage level range within about 5% to 10% of the first charging voltage V1 or the second charging voltage V2 (1213).

Figure 13:
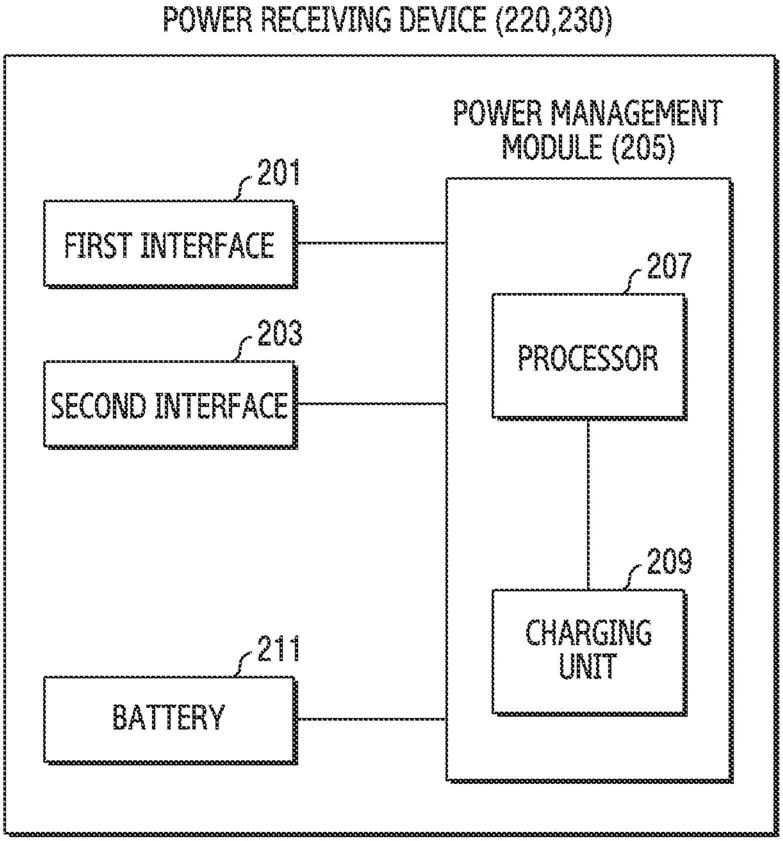
FIG. 13 is a block diagram of a power receiving device according to an embodiment of the disclosure.

FIG. 13 illustrates a block diagram of a power receiving device according to an embodiment of the disclosure.

Referring to FIG. 13, the power receiving device (e.g., at least one of the first power receiving device 220 and the second power receiving device 230 of FIG. 2) according to an embodiment may include at least one of a first interface 201, a second interface 203, a power management module 205, and a battery 211.

In an embodiment, in a case in which the power receiving device (e.g., the first power receiving device 220) is mounted in a first accommodation unit (e.g., the first accommodation unit 102 of FIG. 1) of a power supply device (e.g., the power supply device 100 of FIG. 1), the first interface 201 may be electrically connected with a first interface (e.g., the first interface 106 of FIG. 1) of the power supply device 100 which is included in the first accommodation unit 102, and may transmit and receive power and data. Similarly, in a case in which the power receiving device (e.g., the second power receiving device 230) is mounted in a second accommodation unit (e.g., the second accommodation unit 104 of FIG. 1) of the power supply device 100, the second interface 203 may be electrically connected with a second interface (e.g., the second interface 108 of FIG. 1) of the power supply device 100 which is included in the second accommodation unit 104, and may transmit and receive power and data. In various embodiments, at least one of the first interface 201 and the second interface 203 may include at least one of a power terminal for charging, a ground (GND) terminal, and a terminal for data communication.

In an embodiment, the power management module 205 may include at least one of a processor 207 and a charging unit 209, and may control power of the power receiving device 220 and/or 230. For example, the power management module 205 may charge the battery 211 by using power received from a power supply device 100 under control of the processor 207. Alternatively, the power management module 205 may supply power of the battery 211 to components of the power receiving device 220 and/or 230 under control of the processor 207.

In an embodiment, the processor 207 may generate at least one signal or data related to charging of the power receiving device 220 and/or 230, and may transmit the signal or data to the power supply device 100. For example, the processor 207 may generate SOC information including information regarding at least one of a present state of charge (SOC) value and a capacity of the battery 211 of the power receiving device 220 and/or 230, and may transmit data corresponding to the SOC information to the power supply device 100 according to a designated period, based on powerline communication (PLC) which uses at least one of the first interface 201 and the second interface 203. In an embodiment, the charging unit 209 may include a switching circuit and may control charging or discharging of the battery 211. In an embodiment, the battery 211 may be charged based on power supplied from the power supply device 100, or may be discharged to supply power to the components of the power receiving device 220 and/or 230, under control of the processor 207.

The power supply device 100 and the power receiving device 220 and/or 230 to which various embodiments of the disclosure are applied are not limited to products which are exemplified through the drawings described above. For example, the power supply device 100 may include various types of products (an electronic device couplable with the power receiving device 220 and/or 230), which acquire SOC information of the power receiving device 220 and/or 230, based on PLC with the power receiving device 220 and/or 230, and charge the power receiving device 220 and/or 230 by using a charging voltage (or a charging voltage in each charging section) which is dynamically determined based on the SOC information. Adaptively, the power receiving device 220 and/or 230 may include various types of products (e.g., an electronic device couplable with the power supply device 100 (a smart watch, a smart ring, smart glasses, a smart band, and/or a stylus pen)), which provide SOC information to the power supply device 100 based on PLC with the power supply device 100, and receive power from the power supply device 100 according to a charging voltage (or a charging voltage in each charging section) which is determined by the power supply device 100 based on the SOC information.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device). For example, a processor (e.g., the processor) of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A power supply device comprising:

a first charging accommodation configured to accommodate a first power receiving device;

a second charging accommodation configured to accommodate a second power receiving device, the second power receiving device forming a pair with the first power receiving device;

a first interface disposed in the first charging accommodation and being configured to electrically connect with the first power receiving device when the first power receiving device is mounted in the first charging accommodation;

a second interface disposed in the second charging accommodation and being configured to electrically connect with the second power receiving device when the second power receiving device is mounted in the second charging accommodation;

a battery; and at least one processor electrically connected with the first interface, the second interface, and the battery, wherein the at least one processor is configured to:

receive, from the first power receiving device through power line communication (PLC) based on the first interface, first state of charge (SOC) information of the first power receiving device mounted in the first charging accommodation, receive, from the second power receiving device through the PLC based on the second interface, second SOC information of the second power receiving device mounted in the second charging accommodation, based on the first SOC information and the second SOC information received through the PLC, determine at least one charging parameter, based on a timing of the PLC, identify a first charging section in which PLC is not performed and a second charging section in which PLC is performed, in the first charging section, charge at least one of the first power receiving device or the second power receiving device by using a first charging voltage or a second charging voltage according to the first SOC information and the second SOC information, and in the second charging section, charge at least one of the first power receiving device or the second power receiving device by applying a margin to the first charging voltage or the second charging voltage in order to increase charging voltage.

2. The power supply device of claim 1, wherein the at least one processor is further configured to:

when the first SOC information is received through the first interface, determine the first charging voltage corresponding to the first SOC information, and when third SOC information which is higher than the first SOC information is received through the first interface, determine a third charging voltage which corresponds to the third SOC information and is higher than the first charging voltage.

3. The power supply device of claim 1, wherein the at least one processor is further configured to, when charging from an external power device is detected, transmit charging information of the external power device to the first power receiving device through the first interface.

4. The power supply device of claim 3, wherein the charging information of the external power device includes quick charging information.

5. The power supply device of claim 1, wherein, when the first SOC information received through the first interface and the second SOC information received through the second interface are different, the at least one processor is further configured to:

determine the first charging voltage on the first SOC information with respect to the first power receiving device, determine the second charging voltage on the second SOC information with respect to the second power receiving device, and based on the first charging voltage and the second charging voltage, charge the first power receiving device and the second power receiving device through the first interface and the second interface, respectively.

6. The power supply device of claim 5, wherein, when the first SOC information of the first power receiving device is lower than the second SOC information of the second power receiving device, the at least one processor is further configured to determine the first charging voltage to be higher than the second charging voltage.

7. The power supply device of claim 1, wherein the at least one processor is configured to determine a communication timing to perform the PLC with the first power receiving device by using the first interface while charging the first power receiving device.

8. The power supply device of claim 7, wherein the at least one processor is further configured to:

in a third charging section from a time when it is detected that the first power receiving device is mounted in the first charging accommodation until a time when initial performance of the PLC with the first power receiving device is completed, charge the first power receiving device based on a charging voltage of a designated level, and identify a fourth charging section in which the PLC is not performed with the first power receiving device, and a fifth charging section in which the PLC is performed with the first power receiving device, based on the communication timing.

9. The power supply device of claim 8, wherein the at least one processor is further configured to:

in the fourth charging section, charge the first power receiving device based on a first charging voltage corresponding to the first SOC information, and in the fifth charging section, charge the first power receiving device based on a fourth charging voltage which is higher than the first charging voltage and is of a level that is same as or different from the charging voltage of the designated level.

10. The power supply device of claim 1, wherein the at least one processor is further configured to:

in the first charging section, charge at least one of the first power receiving device or the second power receiving device based on the first charging voltage corresponding to the first SOC information or the second charging voltage corresponding to the second SOC information, and in the second charging section, charge at least one of the first power receiving device or the second power receiving device based on a charging voltage that is variably converted between the first charging voltage and a fourth charging voltage which is higher than the first charging voltage or a charging voltage that is variably converted between the second charging voltage and a fifth charging voltage which is higher than the second charging voltage.

11. The power supply device of claim 1, wherein, when it is detected that the first power receiving device is mounted in the first charging accommodation, the at least one processor is further configured to:

request the first SOC information from the first power receiving device through the first interface, and receive the first SOC information from the first power receiving device.

12. The power supply device of claim 1, wherein the at least one charging parameter is converted in response to the first SOC information and the second SOC information.

13. The power supply device of claim 1, wherein the first charging voltage or the second charging voltage is stepped up or stepped down from a voltage of the battery according to the first SOC information and the second SOC information.

14. An operating method performed by a power supply device, the method comprising:

receiving, by the power supply device from a first power receiving device through power line communication (PLC) based on a first interface, first state of charge (SOC) information of the first power receiving device mounted in a first charging accommodation;

receiving, by the power supply device from a second power receiving device through the PLC based on a second interface, second SOC information of the second power receiving device mounted in a second charging accommodation;

based on the first SOC information and the second SOC information received through the PLC, determining, by the power supply device, at least one charging parameter;

based on a timing of the PLC, identifying, by the power supply device, a first charging section in which PLC is not performed and a second charging section in which PLC is performed;

in the first charging section, charging, by the power supply device, at least one of the first power receiving device or the second power receiving device by using a first charging voltage or a second charging voltage according to the first SOC information and the second SOC information; and in the second charging section, charging, by the power supply device, at least one of the first power receiving device or the second power receiving device by applying a margin to the first charging voltage or the second charging voltage in order to increase charging voltage.

15. The method of claim 14, further comprising:

based on the first SOC information being received through the first interface, determining, by the power supply device, the first charging voltage corresponding to the first SOC information; and based on third SOC information, which is higher than the first SOC information, being received through the first interface, determining, by the power supply device, a third charging voltage corresponding to the third SOC information and being higher than the first charging voltage.

16. The method of claim 14, further comprising:

based on detecting charging from an external power device, transmitting, by the power supply device, charging information of the external power device to the first power receiving device through the first interface.

17. The method of claim 14, further comprising:

based on the first SOC information received through the first interface and the second SOC information received through the second interface being different, determining, by the power supply device, the first charging voltage on the first SOC information with respect to the first power receiving device;

determining, by the power supply device, the second charging voltage on the second SOC information with respect to the second power receiving device; and based on the first charging voltage and the second charging voltage, charging, by the power supply device, the first power receiving device and the second power receiving device through the first interface and the second interface, respectively.

18. The method of claim 17, further comprising:

based on the first SOC information of the first power receiving device being lower than the second SOC information of the second power receiving device, determining, by the power supply device, the first charging voltage to be higher than the second charging voltage.

19. The method of claim 14, further comprising:

based on detecting that the first power receiving device is mounted in the first charging accommodation, requesting, by the power supply device, the first SOC information from the first power receiving device through the first interface; and receiving, by the power supply device, the first SOC information from the first power receiving device.

20. The method of claim 14, wherein the at least one charging parameter is converted in response to the first SOC information and the second SOC information.

* * * * *